United States Patent
Bitouk et al.

(10) Patent No.: US 8,712,189 B2
(45) Date of Patent: *Apr. 29, 2014

(54) METHODS, SYSTEMS, AND MEDIA FOR SWAPPING FACES IN IMAGES

(71) Applicant: The Trustees of Columbia University in the City of New York, New York, NY (US)

(72) Inventors: Dimitri Bitouk, New York, NY (US); Neeraj Kumar, New York, NY (US); Peter N Belhumeur, New York, NY (US); Shree K Nayar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,029

(22) Filed: May 29, 2013

(65) Prior Publication Data

US 2013/0336600 A1  Dec. 19, 2013

Related U.S. Application Data

(63) Continuation of application No. 12/843,455, filed on Jul. 26, 2010, now Pat. No. 8,472,722, which is a continuation of application No. PCT/US2009/032053, filed on Jan. 26, 2009.

(60) Provisional application No. 61/023,226, filed on Jan. 24, 2008.

(51) Int. Cl.
   *G06K 9/32*  (2006.01)

(52) U.S. Cl.
   USPC .................................................. 382/294

(58) Field of Classification Search
   None
   See application file for complete search history.

(56) References Cited

U.S. PATENT DOCUMENTS

| | | | |
|---|---|---|---|
| 7,787,664 B2 | 8/2010 | Luo et al. | |
| 7,848,548 B1 | 12/2010 | Moon et al. | |
| 8,494,232 B2 * | 7/2013 | Bigioi et al. | 382/118 |
| 8,515,137 B2 * | 8/2013 | Richards et al. | 382/118 |
| 2005/0151743 A1 | 7/2005 | Sitrick | |
| 2007/0236513 A1 | 10/2007 | Hedenstroem et al. | |
| 2007/0237421 A1 | 10/2007 | Luo et al. | |
| 2009/0252435 A1 * | 10/2009 | Wen et al. | 382/284 |

OTHER PUBLICATIONS

Agarwala, A., et al., "Interactive Digital Photomontage", In ACM Transactions on Graphics, vol. 23, No. 3, Aug. 2004, pp. 294-302.

(Continued)

*Primary Examiner* — Samir Ahmed
(74) *Attorney, Agent, or Firm* — Byrne Poh LLP

(57) ABSTRACT

Methods, systems, and media for swapping faces in images are provided. In some embodiments, a detected face and face data corresponding to an input image is received. A pose bin associated with the detected face is then identified based on the face data. Next, the detected face is aligned to a generic face associated with the pose bin. At least a portion of a candidate face associated with the pose bin is selected. The at least a portion of the candidate face is then copied to a copy of the input image that is aligned with the generic image to form a swapped-face image. The swapped-face image is next aligned to the input image to form an output image, and then the output image is outputted to a display.

36 Claims, 13 Drawing Sheets

(56) References Cited

OTHER PUBLICATIONS

Avidan, S., and Shamir, A., "Seam Carving for Content-Aware Image Resizing", ACM Transactions and Graphics (TOG), vol. 26, No. 3, Jul. 2007.
Basri, R., and Jacobs, D. "Lambertian Reflectance and Linear Subspaces", IEEE Transactions on Pattern Analysis and Machine Intelligence, vol. 25, No. 2, Feb. 2003, pp. 218-233.
Blanz, V., et al., "Exchanging Faces in Images", Computer Graphics Forum, vol. 23, No. 3, Sep. 2004, pp. 669-676.
Boyle, M., et al., "The Effects of Filtered Video on Awareness and Privacy" In Proceedings of the 2000 ACM Conference on Computer Supported Cooperative Work (CSCW '00), 2000, pp. 1-10.
Cootes, T., et al, "Active Appearance Models", IEEE Transactions on Pattern Analysis and Machine Intelligence, vol. 26, No. 6, Jun. 2001, pp. 681-685.
Debevec, P., et al., "Acquiring the Reflectance Field of a Human Face", In Proceedings of the 27th Annual Conference on Computer Graphics and Interactive Techniques (SIGGRAPH 00), New Orleans, LA, USA, 2000, pp. 145-156.
Efros, A. A., and Freeman, W.T., "Image Quilting for Texture Synthesis and Transfer", In Proceedings of the 28th Annual Conference on Computer Graphics and Interactive Techniques (SIGGRAPH 01), Los Angeles, CA, USA, 2001, pp. 341-346.
Everyscape, 2007. Everyscape. http://www.everyscape.com.
Fergus, R., et al., "Removing Camera Shake From a Single Photograph", ACM Transactions on Graphics, 2006, vol. 25, No. 3, pp. 787-794.
Google, 2007. Google street view. http://maps.google.com/help/maps/streeview.
Gross, R., et al., "Model-Based Face De-Identification", In Conference on Computer Vision and Pattern Recognition Workshop (CVPRW '06), Carnegie Mellon University, USA, 2006, pp. 161-168.
Hays, J., and Efros, A. A., "Scene Completion Using Millions of Photographs", In Computer Graphics Proceedings, Annual Conference Series, (SIGGRAPH 2007), San Diego, CA, USA 2007.
International Preliminary Report on Patentability in International Application No. PCT/US2009/032053, filed Jan. 26, 2009, mailed Aug. 5, 2010.
International Search Report in International Application No. PCT/US2009/032053, filed Jan. 26, 2009, mailed Mar. 11, 2009.
Kundur, D., and Hatzinakos, D., "Blind Image Deconvolution", IEEE Signal Processing Magazine, vol. 13, No. 3, May 1996, pp. 43-64.
Lanitis, A., et al., "Comparing Different Classifiers for Automatic Age Estimation", IEEE Transactions on Systems, Man, and Cybernetics, Part B: Cybernetics, vol. 34, No. 1, Feb. 2004, pp. 621-628.
Liu, Z., et al., "Expressive Expression Mapping with Ratio Images", In Proceedings of the 28th Annual Conference on Computer Graphics and Interactive Techniques (SIGGRAPH 01), Aug. 12-17, Los Angeles, CA, USA, 2001, pp. 271-276.
Malik, S., "Digital Face Replacement in Photographs", University of Toronto, Jan. 2003, available at: http://www.cs.toronto.edu/~smalik/2530/project/downloads/project_report.pdf.
Moghaddam, B., and Yang, M.H., "Learning Gender with Support Faces", In IEEE Transactions on Pattern Analysis and Machine Intelligence (TPAMI '02), vol. 24, No. 5, May 2002, pp. 707-711.
Newton, E.M., et al., "Preserving Privacy by De-Identifying Face Images", IEEE Transactions on Knowledge and Data Engineering, vol. 17, No. 2, Feb. 2005, pp. 232-243.
Notice of Allowance and Fee(s) Due in U.S. Appl. No. 12/843,455, filed Jul. 26, 2010, mailed Feb. 28, 2013.
Omron, 2007. OKAO vision. htttp://www.omron.com/rd/vision/01.html.
Pink Tentacle, "OKAO Vision: Real-Time Smile Analysis", Sep. 7, 2007, available at: http://pinktentacle.com/2007/09/okao-vision-real-time-smile-analysis/.
Ramamoorthi, R. and Hanrahan, P., "An Efficient Representation for Irradiance Environment Maps", In Proceedings of the 28th Annual Conference on Computer Graphics and Interactive Techniques (SIGGRAPH 01), Aug. 12-17, Los Angeles, CA, USA, 2001, pp. 497-500.
Rubner, Y., et al., "The Earth Mover's Distance as Metric for Image Retrieval", International Journal of Computer Vision, vol. 40, No. 2, 2000, pp. 99-121.
U.S. Appl. No. 12/843,455, filed Jul. 26, 2010.
U.S. Appl. No. 61/023,226, filed Jan. 24, 2008.
Wang, H., et al., "Videoshop: A New Framework for Spatio-Temporal Video Editing in Gradient Domain", In Graphical Models, vol. 69, 2007, pp. 57-70.
Wang, Y., et al., "Face Re-Lighting from a Single Image Under Harsh Lighting Conditions", In IEEE Conference on Computer Vision and Pattern Recognition (CVPR 2007), Jun. 17-22, 2007, Carnegie Mellon University, Pittsburgh, PA, USA, pp. 1-8.
Wen, Z., et al., "Face Relighting with Radiance Environment Maps", In IEEE Computer Society Conference on Computer Vision and Pattern Recognition (CVPR '03), Jun. 18-20, 2003, Madison, WI, USA, pp. 158-165.
Written Opinion in International Patent Application No. PCT/US2009/032053, filed Jan. 26, 2009, mailed Mar. 11, 2009.
Xid, 2007. Xid technologies. http://www.xidtech.com.

\* cited by examiner

METHODS, SYSTEMS, AND MEDIA FOR SWAPPING FACES IN IMAGES

CROSS REFERENCE TO RELATED APPLICATION

This application is a continuation under 35 U.S.C. §120 of U.S. patent application Ser. No. 12/843,455, filed Jul. 26, 2010 (the "'455 Application"), which is a continuation under 35 U.S.C. §120 of International Application No. PCT/US2009/032053, filed Jan. 26, 2009 (the "'053 Application"), which claims the benefit of U.S. Provisional Patent Application No. 61/023,226, filed Jan. 24, 2008 (the "'226 Application"). Each of the '455 Application, the '053 Application, and the '226 Application is hereby incorporated by reference herein in its entirety.

TECHNICAL FIELD

The disclosed subject matter relates to methods, systems, and media for swapping faces in images.

BACKGROUND

With the widespread proliferation of digital image capture devices such as digital cameras, digital video recorders, mobile phones containing cameras, personal digital assistants containing cameras, etc., an ever-increasing body of digital images is widely available. These digital images are frequently made available in public forums, such as Web sites and search engines on computer networks such as the Internet.

In many cases, however, a person's face in a given picture may be undesirable. For example, it may be undesirable to have a given person's face in a picture when that person would like to maintain a certain level of privacy. Similarly, a person's face in a given picture may be undesirable because the person's eyes were closed, the person was not smiling, the person was looking away, etc.

SUMMARY

Mechanisms for swapping faces (or portions thereof) in images are provided. These mechanisms, such as methods, systems, and media, can be used in a variety of applications. For example, these mechanisms can be used to perform face de-identification in images (remove a person's identity from an image), to swap multiple faces (or portions thereof) within the same image, to swap a person's face (or a portion thereof) in an image with another version of the same person's face (or a portion thereof) from another image, to create group photographs by combining faces (or portions thereof) of multiple persons from different images, etc. Face swapping in accordance with some embodiments can be performed by using a face detection mechanism to detect a face within an input image and determine pose and fiducial point data for the image. A pose bin corresponding to the pose of the detected face can then be identified and the detected face aligned to a generic face associated with the pose bin. Candidate faces (or portions thereof) for swapping with the detected face can next be selected. Copies of the input image with swapped faces (or portions of swapped faces) can then be created. At least one of these copies can finally be re-aligned to the orientation of the input image and output as necessary (e.g., to a display device).

DETAILED DESCRIPTION

Figure 1:
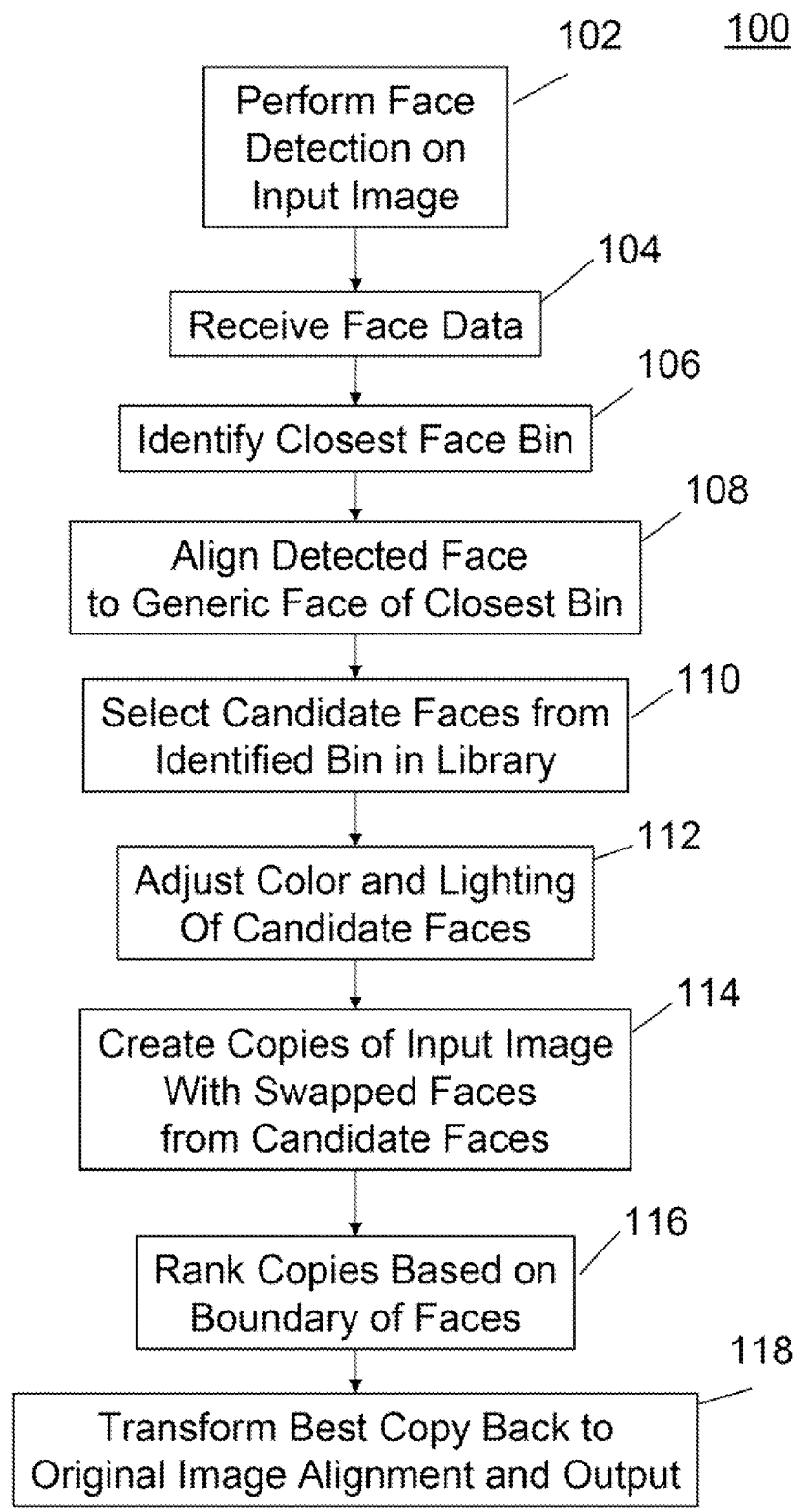
FIG. 1 is a diagram of a process for swapping images (or portions thereof) in accordance with some embodiments.
Figure 8:
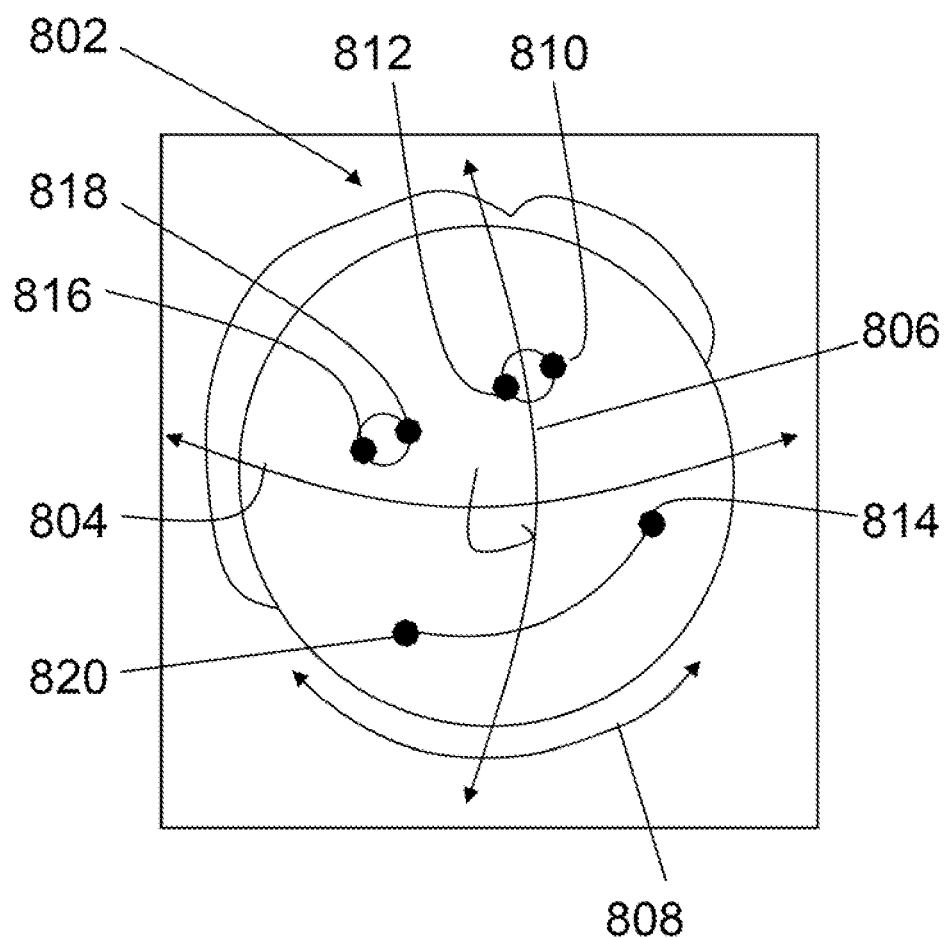
FIG. 8 is a diagram of a detected face showing yaw, pitch, and roll angles and fiducial points in accordance with some embodiments.

Turning to FIG. 1, a process 100 for swapping faces (or portions thereof) in images in accordance with some embodiments is illustrated. As shown, process 100 begins by performing face detection on an input image at 102. This input image can be provided from any suitable source. For example, the input image can be stored on image storage media (e.g., a memory device, a disk drive, etc.), can be received over an interface (e.g., from a computer network, from a camera, etc.), can be produced locally (e.g., from an image capture device), etc. An example of a face that can be detected is shown in FIG. 8 as face 802. Face detection can be performed using any suitable mechanism. For example, in some embodiments, face detection can be performed using the OKAO VISION product produced by OMRON CORPORATION of Kyoto, Japan. As shown in FIG. 8, the face detection mechanism can provide data that indicates the yaw 804, pitch 806, and roll 808 of the detected face. As also shown in FIG. 8, this mechanism can provide data that indicates six (or any suitable number) fiducial points 810, 812, 814, 816, 818, and 820. As illustrated, these fiducial points can identify the locations of the inside and outside corners of each eye and the corners of the mouth in the detected face. The detected face and the face data can then be received from the face detection mechanism at 104.

In order to provide realistic face swapping, the detected face (or a portion thereof) is swapped only with faces (or a portion thereof) having similar yaw and pitch angles in some embodiments. To facilitate swapping faces (or portions thereof) with similar yaw and pitch angles, the faces can be associated with pose bins having any suitable ranges of yaw and pitch angles. For example, in some embodiments, the yaw angle ranges for bins can include: −25.00 degrees to −15.01 degrees; −15.00 degrees to −5.01 degrees; −5.00 degrees to +5.00 degrees; +5.01 degrees to +15.00 degrees; and +15.01 degrees to +25.00 degrees. As another example, in some embodiments, the pitch angle ranges for bins can include: −15.00 degrees to −5.01 degrees; −5.00 degrees to +5.00 degrees; and +5.01 degrees to +15.00 degrees. Thus, a single bin can have any combination of these yaw and pitch angle ranges, such as −25.00 degrees to −15.01 degrees in yaw and −5.00 degrees to +5.00 degrees in pitch.

Next, at 106, process 100 can identify the closest pose bin to the detected face. For example, if the face has a yaw of −6.15 degrees and a pitch of +7.84 degrees, the pose bin having the yaw range of −15.00 degrees to −5.01 degrees and the pitch range of +5.01 degrees to +15.00 degrees can be identified.

Figure 9:
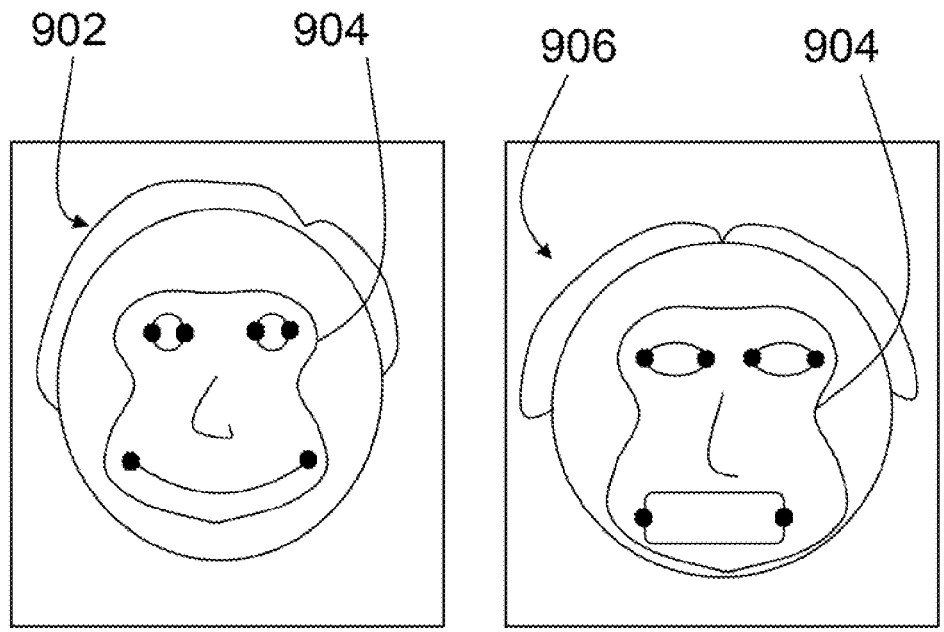
FIG. 9 is a diagram of a detected face and a candidate face showing a face-swapping mask in accordance with some embodiments.

Each pose bin can be associated with a generic face for that bin that defines a set of fiducial points and a mask for swapping faces (or portions thereof). An example of a mask 904 for swapping faces between a detected face 902 and a candidate face 906 is illustrated in FIG. 9. This mask can define a replacement region for the faces and a boundary for the replacement region. This mask can be static (e.g., the mask does not change) or dynamic (e.g., the mask changes depending on the contents on the pose bin or on some other suitable factor). Although masks are illustrated which capture nearly all of a given face, masks can be used in some embodiments that capture only a portion (or multiple portions) of a face.

Figure 12:
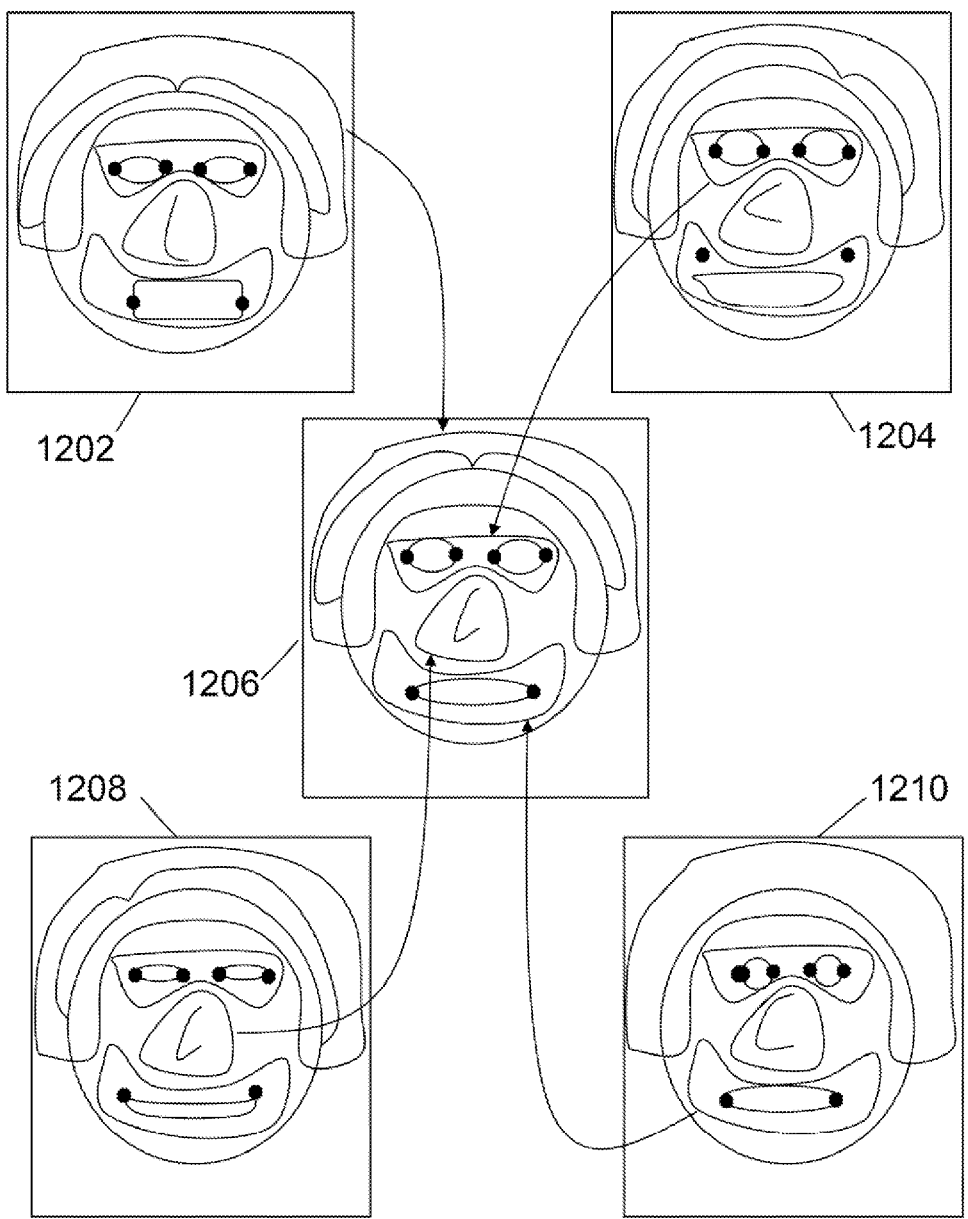
FIG. 12 is a diagram illustrating the swapping of portions of faces from different candidate faces in accordance with some embodiments.

In some embodiments, mechanisms for face swapping can be used to combine different portions of faces from different candidate faces to form a new composite face. For example, as illustrated in FIG. 12, portions of candidate faces 1202, 1204, 1208, and 1210 can be combined together to form a face-swapped face 1206. In face 1206, the hair comes from face 1202, the eyes come from face 1204, the nose comes from face 1208, and the eyes come from 1210. Although four different faces portions are shown, any suitable number of portions can be used in some embodiments. The mask for the generic face for the corresponding bin can be constructed to include boundary parameters for each portion. The mask can also include parameters for providing layers so that one or more portions (such as a mouth, for example) can be used to overlay one or more other portions (such as a lower face, for example).

Figure 10:
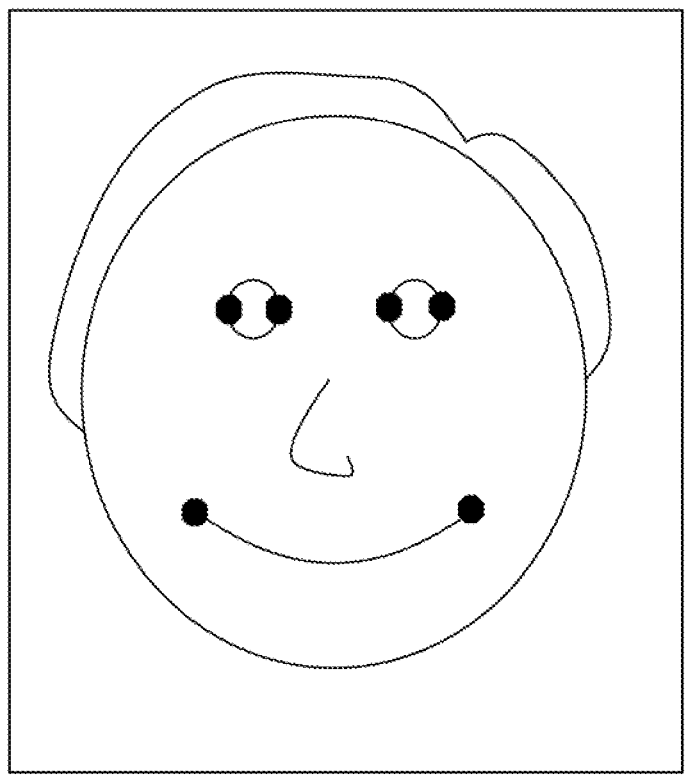
FIG. 10 is a diagram of a detected face that has been aligned to a generic face in accordance with some embodiments.

At 108, the detected face can next be aligned to the fiducial points of the generic face of the identified bin. FIG. 10 illustrates an example of the alignment of the detected face from FIG. 8. This alignment can be effected by estimating an affine transformation between the fiducial points of the detected face in FIG. 8 and the fiducial points of the generic face of the identified bin in FIG. 9, and then applying that affine transformation to the detected face.

Figure 2:
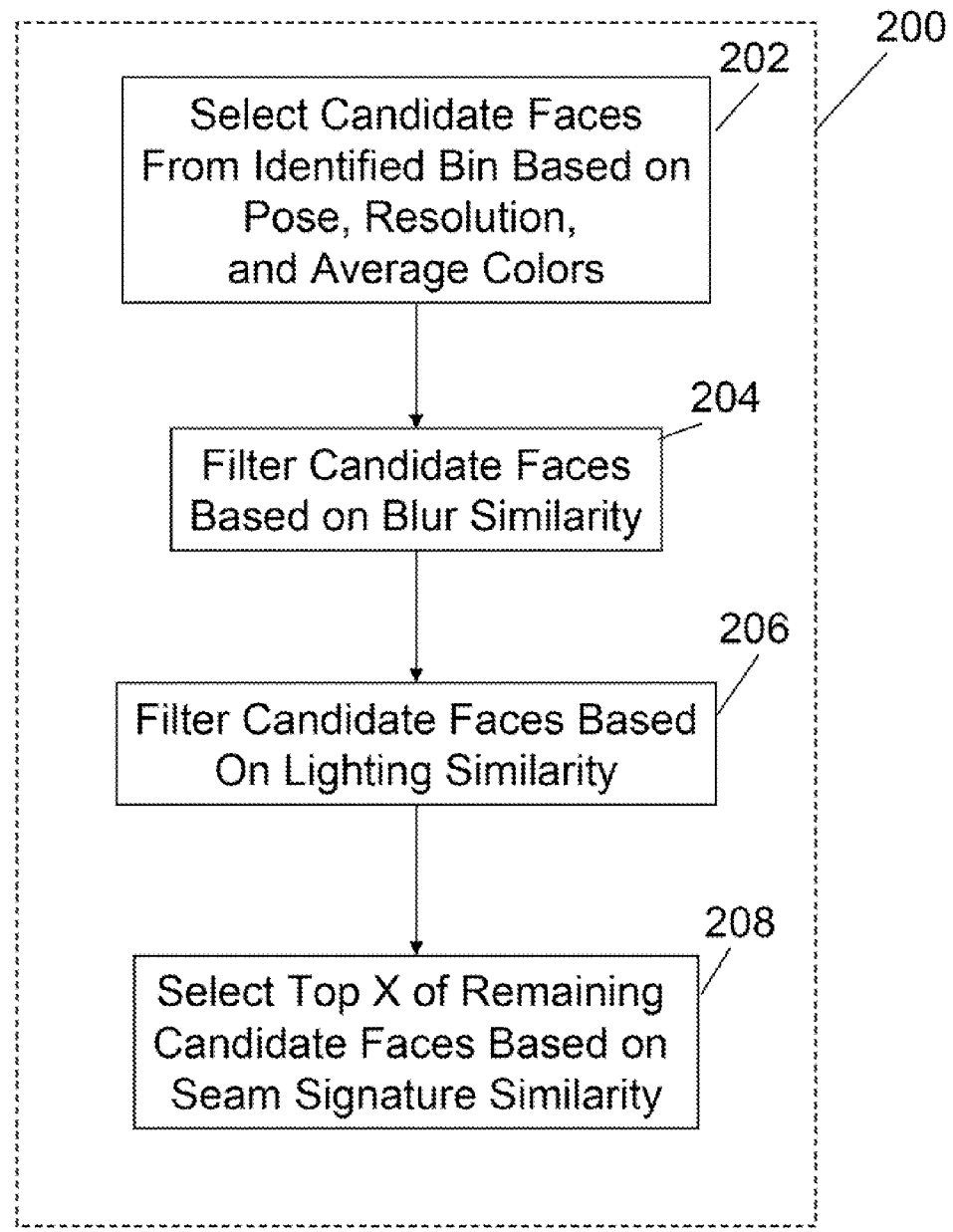
FIG. 2 is a diagram of a process for selecting candidate faces (or portions thereof) in accordance with some embodiments.

Candidate faces (or portions thereof) from the identified pose bin can then be selected from a library of faces (or any other suitable source of faces (such as the same or other images)) at 110. An example of a process 200 for selecting candidate faces (or portions thereof) is shown in FIG. 2. Although the process of FIG. 2 is illustrated and described as being applied to faces, this process can be applied to faces or portions of faces in some embodiments. As illustrated, process 200 can begin at 202 by selecting candidate faces from the identified bin based on pose, resolution, and average colors. Any suitable mechanism for selecting candidate faces can be used.

Figure 3:
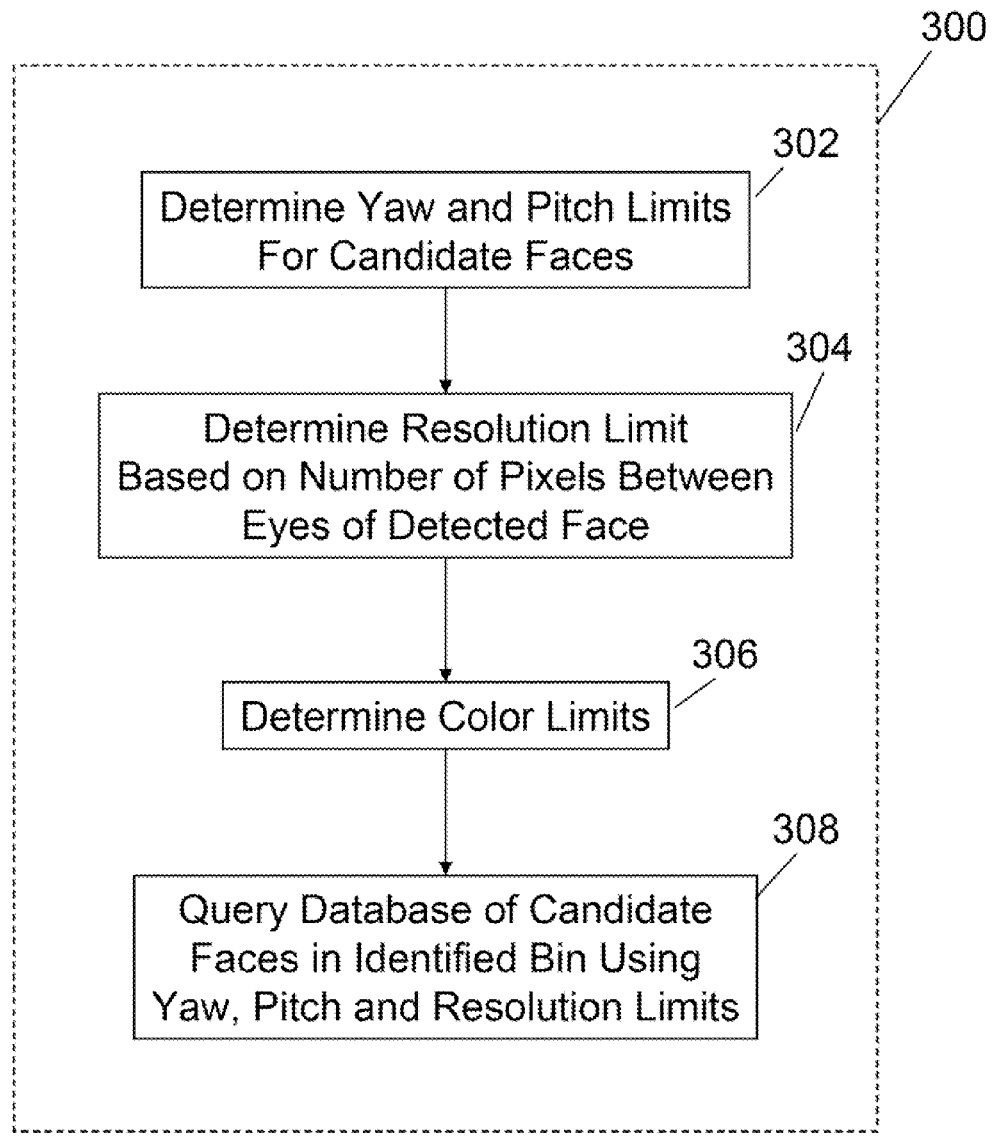
FIG. 3 is a diagram of a process for selecting candidate faces (or portions thereof) based on pose, resolution, and average color limits in accordance with some embodiments.

An example of a process 300 for selecting candidate faces (or portions thereof) based on pose, resolution, and average colors is shown in FIG. 3. Although the process of FIG. 3 is illustrated and described as being applied to faces, this process can be applied to faces or portions of faces in some embodiments. As illustrated, process 300 can first determine yaw and pitch limits for candidate faces at 302. Any suitable limits can be used. For example, in some embodiments, the yaw and pitch angles for candidate faces can be limited to +/−3 degrees from the yaw and pitch angles of the detected face. Next, at 304, process 300 can determine one or more resolution limits for the candidate faces based on the number of pixels between the eyes of the detected face (or any other suitable points on a face or a portion thereof). In some embodiments, this resolution limit only includes a minimum limit because candidate faces with higher-than-necessary resolutions can be down-sampled. For example, in some embodiments, the resolution limit for candidate faces dictates that each candidate face must have at least 80% of the number of pixels between the eyes of the detected face in the same region (or any other points).

Figure 4:
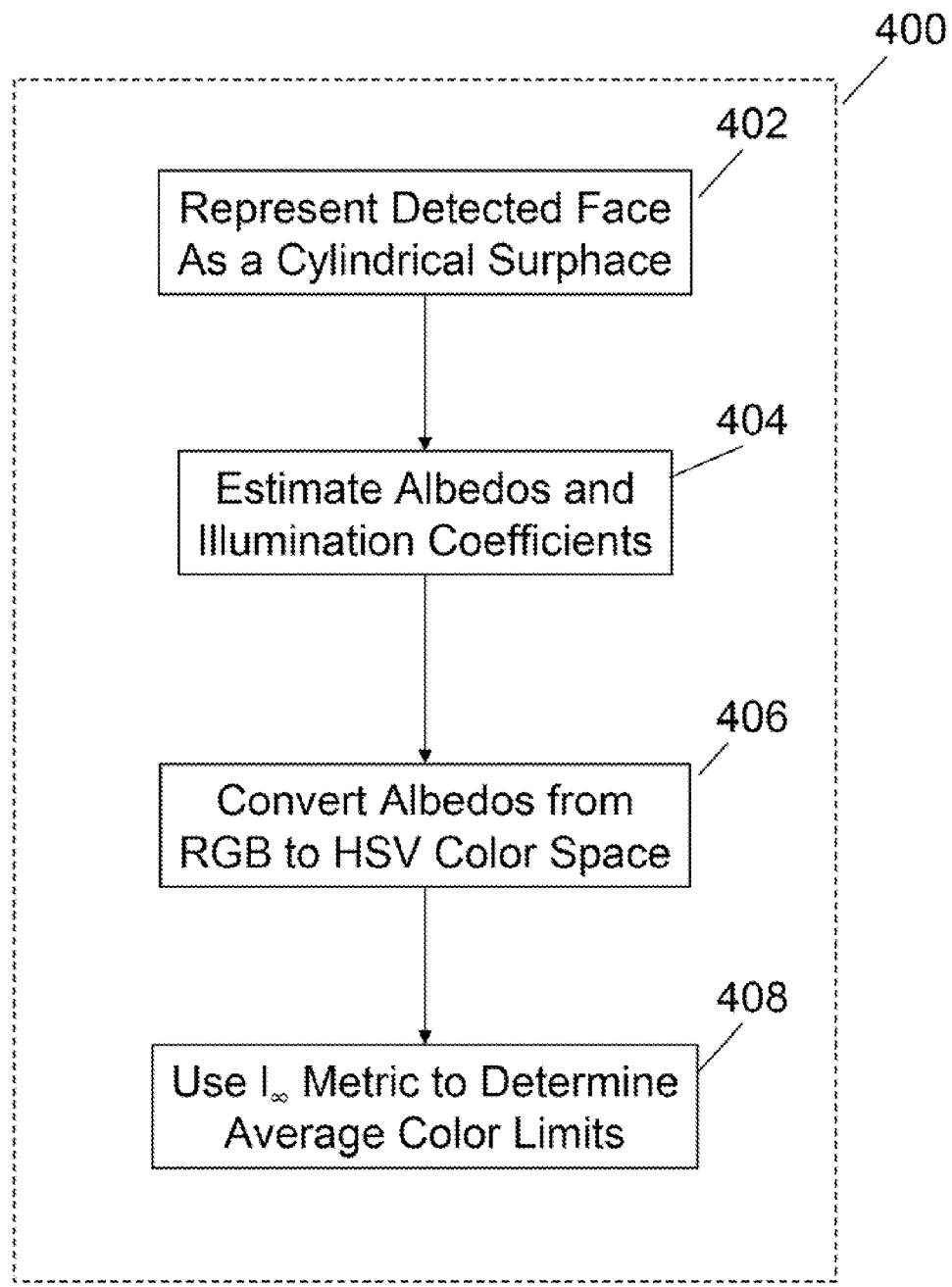
FIG. 4 is a diagram of a process for determining color limits for faces (or portions thereof) in accordance with some embodiments.

At 306, process 300 can then determine color limits for the candidate faces. Color limits can be selected using any suitable process. For example, as shown in FIG. 4, a process 400 can be used in some embodiments to determine the color limits for candidate faces (or portions thereof). Although the process of FIG. 4 is illustrated and described as being applied to faces, this process can be applied to faces or portions of faces in some embodiments. As illustrated, at 402, the detected face is represented as a generic cylindrical surface that is aligned to the coordinate system of the identified pose bin. In order to do so, in some embodiments: a simple orthographic projection is used to define the mapping from the surface to the face image; it is assumed that the face image is Lambertian; and the image intensity $I^{(c)}(x, y)$ of the face replacement region in each of the RGB color channels is approximated as $\tilde{I}^{(c)}(x, y)$ using a linear combination of nine spherical harmonics as shown in equation (1):

$$\tilde{I}_c(x, y) = \rho_c \sum_{k=1}^{9} a_{c,k} H(n(x, y)), c \in \{R, G, B\}, \tag{1}$$

where n(x, y) is the surface normal at the image location (x, y), $\rho_c$ are the constant albedos for each of the three color channels which represent the average color within the replacement region, the coefficients $a_{c,k}$ describe the illumination conditions, and $H_k(n)$ are the spherical harmonic images. Also, an orthonormal basis $\psi_k(x,y)$ is created by applying the Gram-Schmidt orthonormalization to the harmonic basis $H_k(n)$ and the approximate image intensity $\tilde{I}_c(x, y)$ is expanded using this orthonormal basis as shown in equation (2):

$$\tilde{I}_c(x, y) = \rho_c \sum_{k=1}^{9} \beta_{c,k} \psi_k(x, y), c \in \{R, G, B\}. \tag{2}$$

The three albedos ($\rho_R, \rho_G, \rho_B$) and the 27 illumination coefficients ($\beta_{c,k;\ c=R,G,B;\ k=1\text{-}9}$) are then estimated at 404 by minimizing the sum-of-squared difference between the right hand side of equation (2) and the aligned face image $I_c(x,y)$ within the replacement region. The RGB albedos are converted to the HSV color space at 406 and the $l_\infty$ metric is used to determine limits on the average color (in the HSV color space) within the replacement regions for candidate faces at 408. In some embodiments, only candidate faces having hue and saturation levels within 5% of the detected face and brightness levels within 10% of the detected face are kept.

Once the limits at 302, 304, and 306 of FIG. 3 have been determined, process 300 can then select candidate faces in the identified bin using these limits. For example, in some embodiments, the process can perform a database query (using any suitable database query language, such as SQL) to select candidate faces from a library database.

Figure 5:
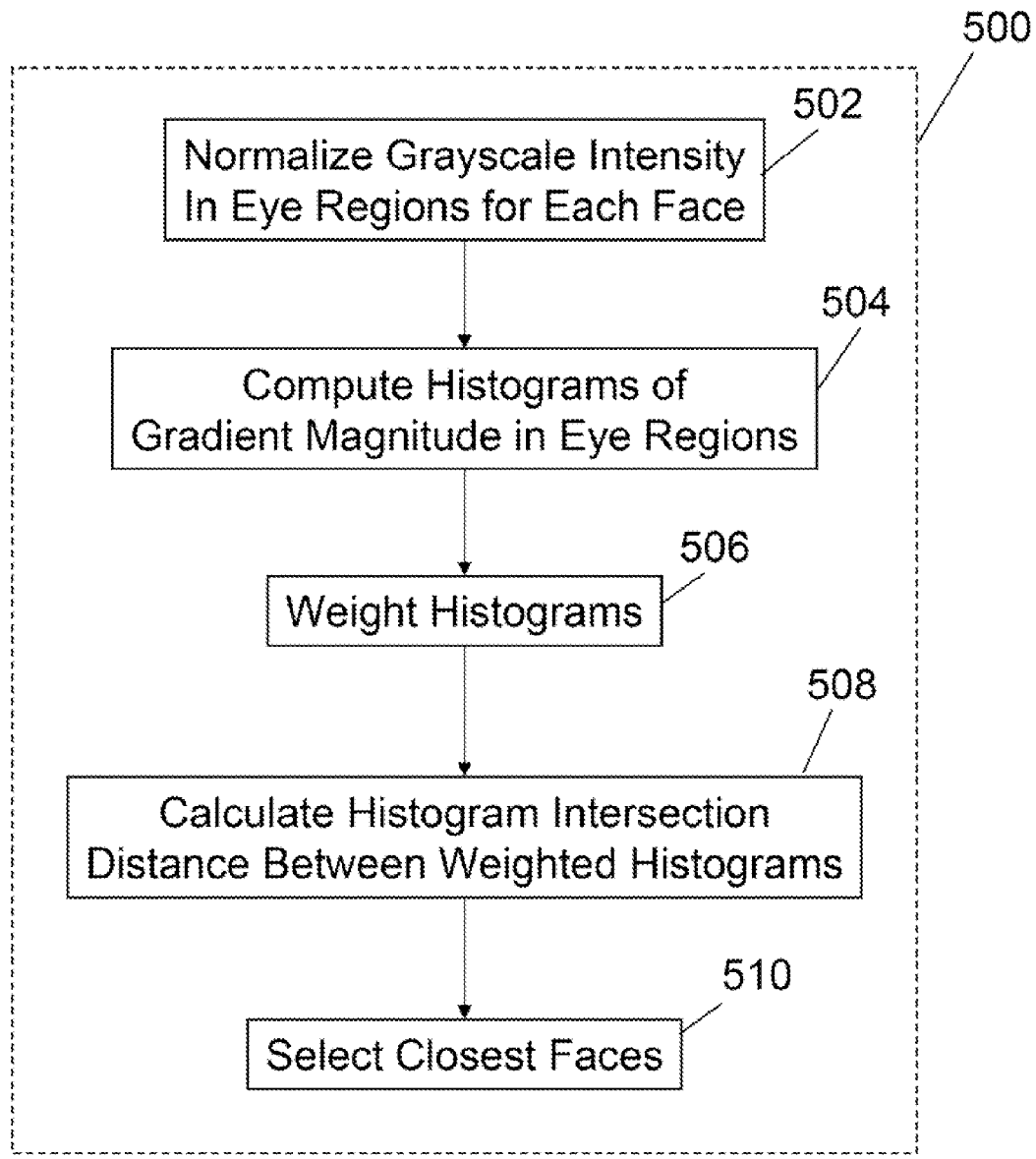
FIG. 5 is a diagram of a process for comparing blur in images (or portions thereof) in accordance with some embodiments.

Turning back to FIG. 2, process 200 can next filter the candidate faces at 204 based on blur similarity between the detected face and the candidate faces. Any suitable mechanism for comparing the blur similarity between the detected face and the candidate faces can be used. For example, in some embodiments, a process 500 as shown in FIG. 5 can be used to compare blur similarity. Although the process of FIG. 5 is illustrated and described as being applied to faces, this process can be applied to faces or portions of faces in some embodiments. As illustrated, process 500 normalizes the grayscale intensity in the eye regions of the detected face and each candidate face at 502. Any suitable normalization can be used. For example, in some embodiments, the grayscale intensities can be normalized to zero mean and unit variance. Next, at 504, the process computes histograms of the gradient magnitude in the eye regions (or any other suitable region) of the detected face and each candidate face. The histograms are then weighted at 506. Any suitable weighting can be used. For example, the histograms can be multiplied by a weighting function which uses the square of the histogram bin index, n, as follows:

$$\tilde{h}^{(i)}(n) = n^2 h^{(i)}(n), i=1,2. \quad (3)$$

At 508, the Histogram Intersection Distance between the weighted histogram for the detected face and each of the candidate faces can next be calculated. The candidate faces that are closest to the detected face can then be selected at 510. For example, in some embodiments, the closest 50% of the candidate faces can be selected.

Next, at 206, process 200 of FIG. 2 can filter candidate faces based on lighting similarity. Any suitable mechanism for filtering candidate faces based on lighting similarity can be used in some embodiments. For example, candidate faces can be filtered based on lighting similarity by measuring the $l_2$ distance between the corresponding illumination coefficients (which can be determined in some embodiments as described above in connection with FIG. 4, for example) of the detected face and each of the candidate faces as follows:

$$d_L(I^{(1)}, I^{(2)}) = \left( \sum_{c \in \{R,G,B\}} \sum_{k=1}^{9} (\beta_{c,k}^{(1)} - \beta_{c,k}^{(2)})^2 \right)^{1/2}, \quad (4)$$

and keeping the top 50% (or any other suitable number) closest candidate faces.

Figure 6:
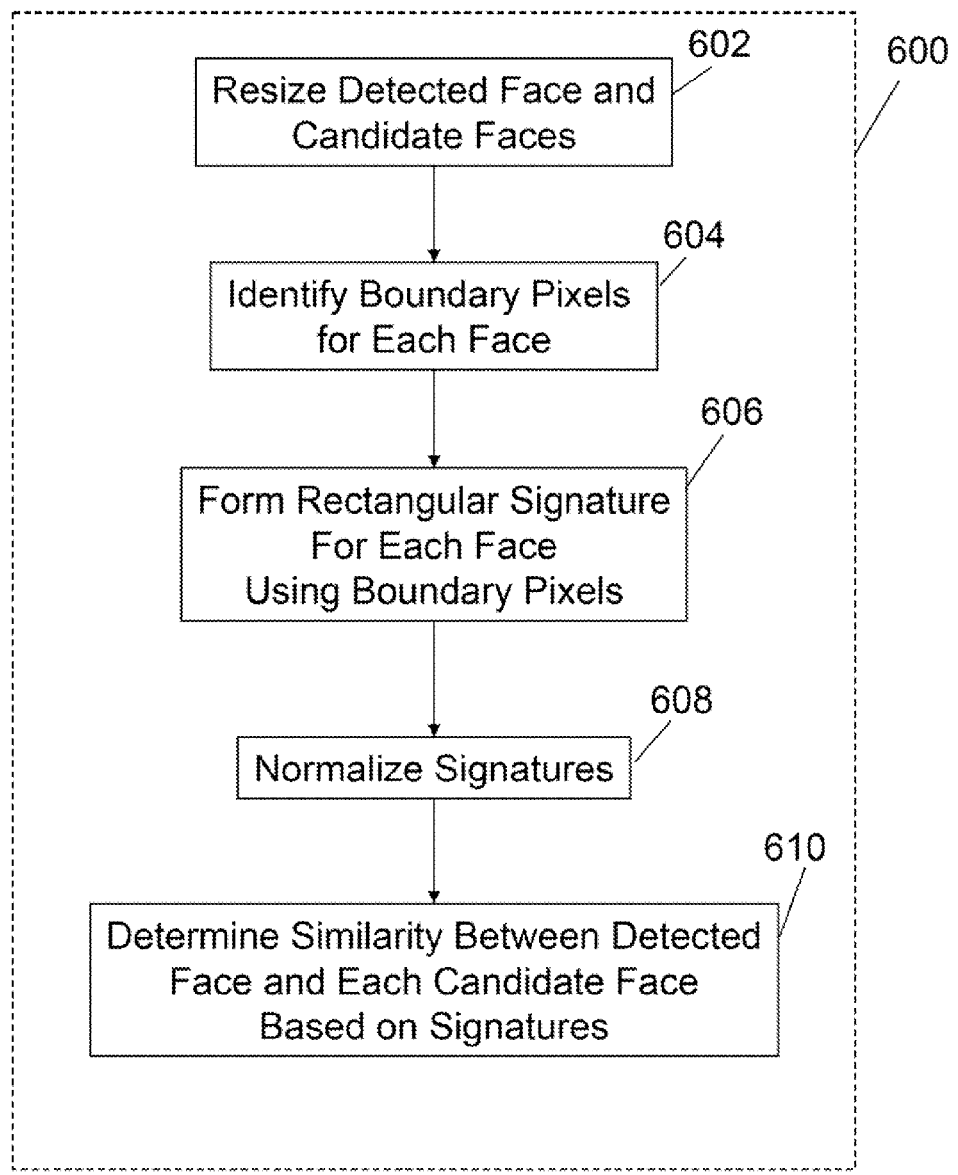
FIG. 6 is a diagram of a process for comparing seam signatures in accordance with some embodiments.

At 208, the candidate faces can be filtered based on the similarity of a seam signature along the border of the detected face and each candidate face. Any suitable mechanism for comparing seam signature similarity can be used in some embodiments. For example, a process 600 as shown in FIG. 6 can be used to compare a seam signature similarity. Although the process of FIG. 6 is illustrated and described as being applied to faces, this process can be applied to faces or portions of faces in some embodiments. As illustrated, process 600 first resizes the detected face and each candidate face at 602. For example, these faces can be resized to 256×256 pixels (or any other suitable size). Next, at 604, the process can identify boundary pixels for each of the faces. For example, boundary pixels can include any pixels within a six-pixel radius of the outside of the replacement region. These pixels can then be formed into a rectangular signature at 606. For example, the boundary pixels can be unfolded into a rectangular image by starting at the highest point on the boundary, copying pixels to a rectangular image, and working around the boundary clockwise. The signatures for each of the faces can then be normalized to have the same average intensity at 608. At 610, the similarity of each candidate face to the detected face can be determined by measuring the $L_2$ distance of the absolute value of the gradient in the direction along the seam between each candidate face and the detected face. In some embodiments, to avoid penalizing gradual changes in appearance, a distance of zero can be used for all pixels within 8% of each other and the $L_2$ distance only used for pixels which differ by more than this amount. The candidate faces closest to the detect face can then be kept. For example, the top 50 (or any other suitable number) closest of the candidate faces can be kept in some embodiments.

Turning back to FIG. 1, after candidate faces are selected at 110 as described above the color and lighting of candidate faces (or portions thereof) can be adjusted (or relit) at 112. Any suitable mechanism for adjusting the color and lighting of candidate faces (or portions thereof) can be used in some embodiments. For example, the color and lighting of the candidate faces (or portions thereof) can be adjusted by determining the approximate image intensities, $\tilde{I}_c(x, y)$ in equation (2), for the detected face (or a portion thereof) ($\tilde{I}_c^{(1)}(x, y)$) and each of the candidate faces (or portions thereof) ($\tilde{I}_c^{(2)}(x, y)$), and multiplying the candidate image (or a portion thereof) ($I_c^{(2)}(x, y)$) by the ratio of the approximate images (or portions thereof) as follows:

$$\tilde{I}_c^{(2)} = I_c^{(2)} \left( \frac{\tilde{I}_c^{(1)}}{\tilde{I}_c^{(2)}} \right), c \in \{R, G, B\}. \quad (5)$$

In some embodiments, each relit candidate face (or a portion thereof) can also be transformed so that its RGB histogram matches that of the detected face (or a portion thereof) within the replacement region.

Figure 11:
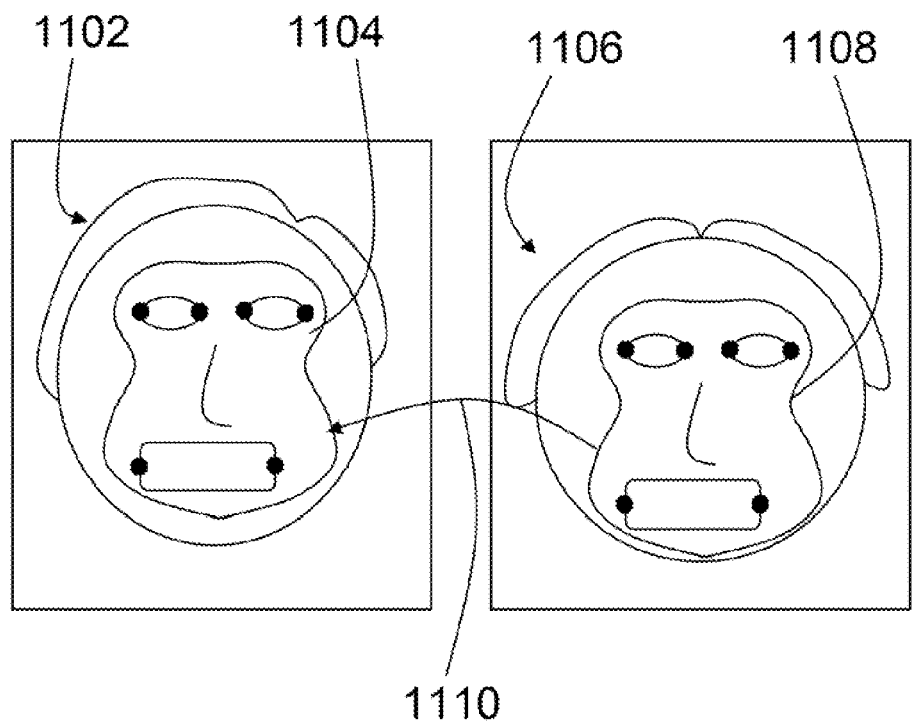
FIG. 11 is a diagram illustrating the swapping of faces in accordance with some embodiments.

Next, at 114, face-swapped copies of the input image with faces (or portions thereof) swapped from the candidate faces are created by: copying the pixels in the replacement region of the candidate faces (or portions thereof) to an aligned copy of the input image; and then feathering a strip of pixels inside the boundary for a distance equal to 11% (or any other suitable number) of the distance between the eyes (or any other suitable points) in the detected face (or a portion thereof). An example of the swapping of faces is shown in FIG. 11. As illustrated, an aligned input image 1102 has a new, swapped face 1104 that was copied from replacement region 1108 of candidate face 1106.

At 116, the face-swapped copies are then ranked to determine which copy is best. Any suitable mechanism for ranking the face-swapped copies can be used in some embodiments. For example, the ranking can be performed by comparing the pixels in the boundary regions of the face-swapped copies to the pixels in the boundary region(s) of the detected face. This comparison can be performed as illustrated in FIG. 6 and described above, except that instead of using pixels within a six-pixel radius of the boundary as the boundary pixels, pixels inside the boundary for a distance equal to 11% (or any other suitable number) of the distance between the eyes (or any other suitable points) in the detected face can be used as the boundary pixels. The most-similar face-swapped copy can then be considered the best. This best copy can then be re-aligned to the alignment of the original input image (using any suitable mechanism, such as an affine transformation) and output as necessary at 118. For example, in some embodiments, the best copy can be output to a display device such as a computer monitor, camera display, mobile phone display, personal data assistant display, etc.

As described above, a library of candidate faces can be used for face swapping. This library can include any suitable set of faces. For example, the library can include faces for a random and wide array of faces gathered from public sources of images, such as the Internet. The library can additionally or alternatively include a limited set of faces, such as a set of faces belonging to a particular person or group of persons. This library can be constructed in any suitable fashion and can include an association of candidate faces with pose bins (as described above).

Figure 7:
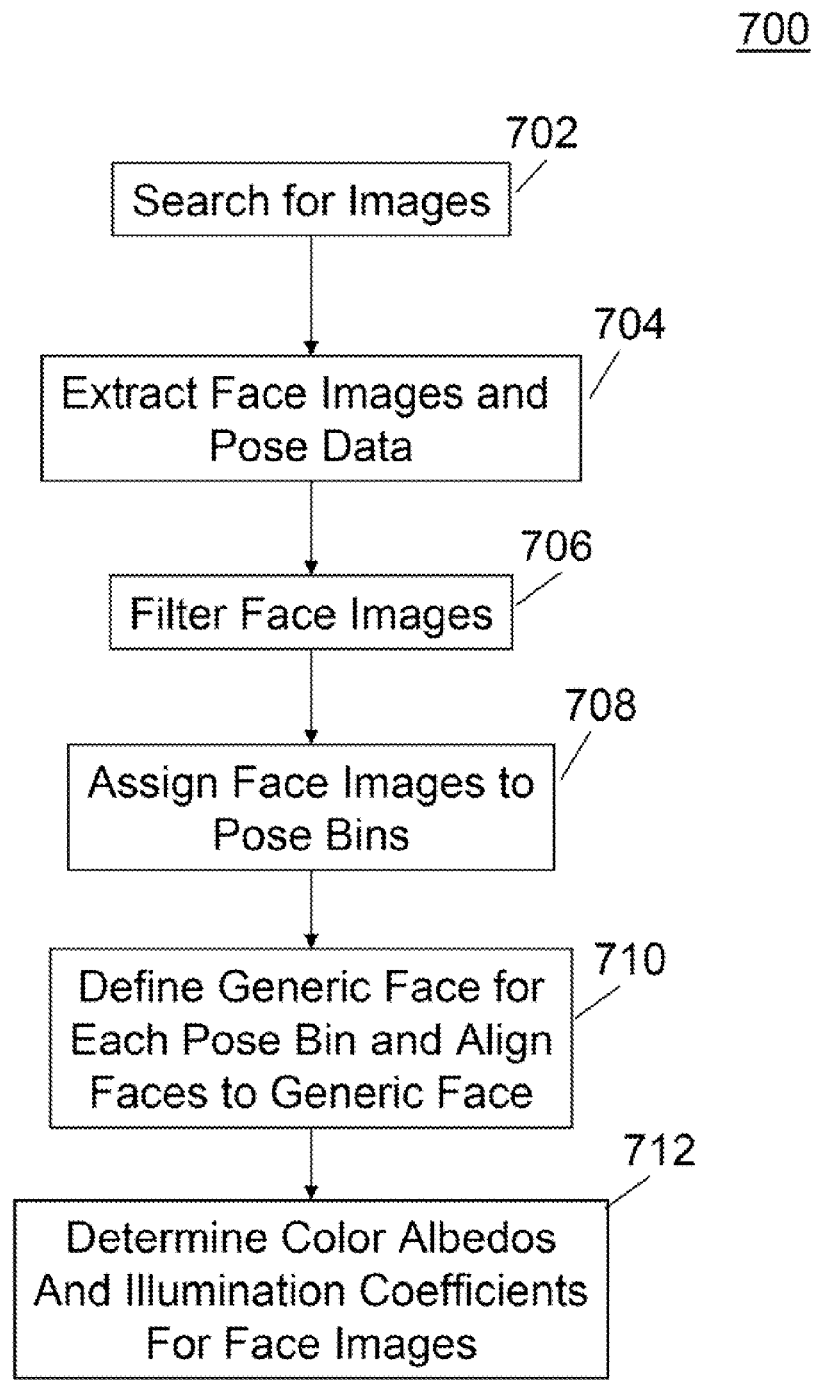
FIG. 7 is a diagram of a process for building a library of candidate faces in accordance with some embodiments.

An example of a process 700 for constructing a library that can be used in some embodiments is illustrated in FIG. 7. As shown, the process searches for images at 702. Searching can be performed in any suitable manner on any suitable source. For example, key word searching on image sharing Web sites can be performed. As another example, key word searching on search engines can be performed. As yet another example, a limited set of images can be provided by a user. Next, at 704, candidate face images, pose data, and fiducial points are extracted and stored. These images, data, and points can be extracted using any suitable mechanism. For example, face detection mechanisms, such as the OKAO VISION product, can be used to detect faces in images and determine pose data and fiducial points, and then known image cropping techniques can be used to extract candidate faces. The candidate faces are then filtered at 706 to eliminate duplicate faces, very small faces, saturated faces, under-exposed faces, faces with extreme pose angles, etc. Next, at 708, the remaining faces are associated with pose bins as described above. At 710, a generic face for each pose bin is defined and each candidate face aligned to the generic face for its corresponding bin (e.g., using an affine transformation based on the fiducial points of the candidate faces and the generic face similar to that described above for 108 of FIG. 1). Finally, color albedos and illumination coefficients for the candidate faces are then determined (e.g., similarly to that described above in connection with FIG. 4) and stored for each candidate face. In some embodiments, additional data relating to the candidate faces, such as gender, age, "big nose," "narrow eyes," "wide-open mouth," etc., can additionally be stored for each candidate face and used in the candidate face selection process.

The face swapping mechanism described herein can be used for any suitable application in some embodiments. For example, this face swapping mechanism can be used to perform face de-identification in images. More particularly, some images may include portions that show faces that are undesirable in the images. This may be the case, for example, when a person caught in a public image wishes to not be shown in a display of that image. Rather than manually removing the person's face and substituting it with another face, or obscuring the face with an area of solid color, the face swapping mechanism described herein can be used to replace the person's face (or a portion thereof) with a realistic-looking alternative.

As another example, this face swapping mechanism can be used to swap faces (or portions thereof) within an image—i.e., swapping one face (or a portion thereof) in an image for another face (or a portion thereof) in the same image. This can be desirable for entertainment or any other suitable purpose.

As still another example, this face swapping mechanism can be used to swap a person's face (or a portion thereof) in an image with another version of the same person's face (or a portion thereof). This may be desirable when, for example, the person does not like how the person's face (or a portion thereof) appeared in the image and wishes to substitute it with another version. To facilitate such personalized face swapping, the library in such a case can be limited to including only pictures of the given person's face.

As yet another example, this face swapping mechanism can be used to create group photographs in which all persons shown have their eyes open, are smiling, and are looking the correct direction, for example. To create such a group photograph, multiple pictures of a group can be rapidly taken using a camera in a "burst" mode or a video camera. A desired one of these photographs can then be used as an input image and suitable detection mechanisms used to determine which faces (or portions thereof) in the photograph have closed eyes, are not smiling, are looking away, etc. Other photographs taken in the burst mode can then be used to provide candidate faces (or portions thereof) to replace the faces (or portions thereof) with eyes closed, etc. The best candidate faces (or portions thereof) can then be combined with the input image to provide an output image with all persons smiling, having eyes opened, facing the correct direction, etc.

Figure 13:
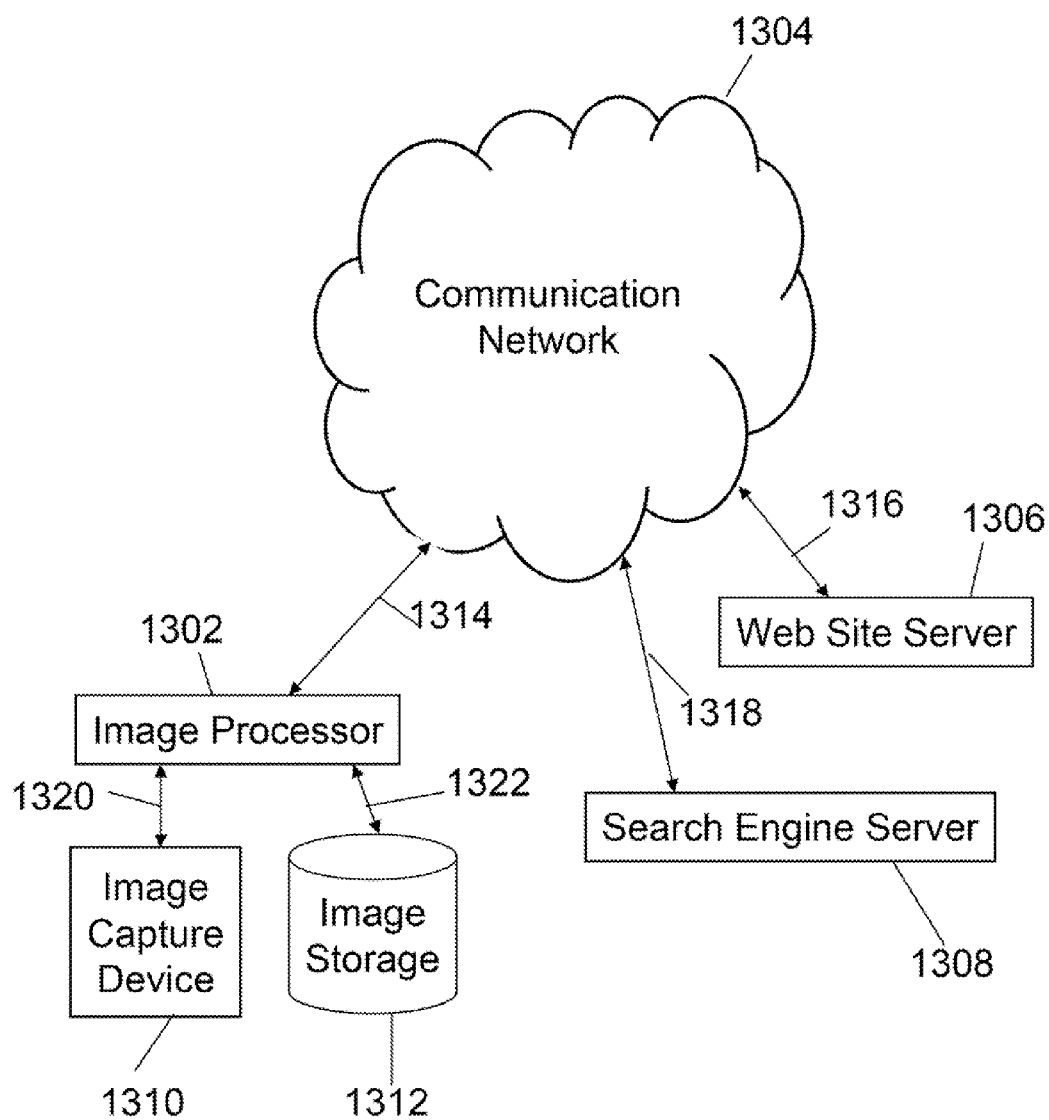
FIG. 13 is a diagram of hardware that can be used to swap faces (or portions thereof) in accordance with some embodiments.

FIG. 13 illustrates hardware 1300 that can be used to implement face swapping mechanisms as described herein in accordance with some embodiments. As shown, hardware 1300 includes an image processor 1302, a communication network 1304, a Web site server 1306, a search engine server 1308, an image capture device 1310, image storage 1312, and connections 1314, 1316, 1318, 1320, and 1322. Image processor 1302 can be any suitable device that can process images and image-related data as described herein. For example, processor 1302 can be a general purpose device such as a computer or a special purpose device such as a client, a server, an image capture device (such as a camera, video recorder, scanner, mobile telephone, personal data assistant, etc.), etc. Web site server 1306 and search engine server 1308 can be any suitable devices for serving Web-site and search-engine data and/or images. For example, servers 1306 and 1308 can be general purpose devices such as a computer or special purpose devices such as a client, a server, etc. Any of these general or special purpose devices can include any suitable components such as a processor (which can be a microprocessor, digital signal processor, a controller, etc.), memory, communication interfaces, display controllers, input devices, etc. Image capture device 1310 can be any suitable device for capturing images such as a camera, video recorder, scanner, mobile telephone, personal data assistant, etc. Image storage 1312 can be any suitable device for storing images such as memory, a disk drive, a network drive, a database, a server, etc. Communication network 1304 can be any suitable communication network, such as the Internet, a local area network (LAN), a wide area network (WAN), a wired network, a wireless network, a telephone network, a cable television network, a satellite network, any combination of the same, etc. Connections 1314, 1316, 1318, 1320, and 1322 can be any suitable connections for connecting the other devices illustrated in FIG. 13. For example, these connections can be wired connections, wireless connections, any combination of the same, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for swapping faces in images, comprising:
receiving a detected face and face data corresponding to an input image;
identifying a pose bin associated with the detected face based on the face data;
aligning the detected face to a generic face associated with the pose bin;
selecting a plurality of candidate faces associated with the pose bin;
copying at least a portion of each of the plurality of candidate faces to a copy of the input image that is aligned with the genetic face to form a plurality of swapped-face images;
comparing boundary pixels in each of the plurality of swapped-face images with boundary pixels in the detected face;
selecting a swapped-face image from the plurality of swapped-face images based on the comparing;
aligning the selected swapped-face image to the input image to form an output image; and
outputting the output image to a display.

2. The method of claim 1, further comprising performing face detection on the input image to provide the detected face and the face data.

3. The method of claim 1, wherein the pose bin has an associated range of yaw values and an associated range of pitch values.

4. The method of claim 1, wherein the detected face is aligned to the generic face using an affine transformation.

5. The method of claim 1, wherein the plurality of candidate faces are selected based on pose similarity to the detected face.

6. The method of claim 1, wherein the plurality of candidate faces are selected based on resolution similarity to the detected face.

7. The method of claim 1, wherein the plurality of candidate faces are selected based on average color similarity to the detected face.

8. The method of claim 1, wherein the plurality of candidate faces are selected based on blur similarity to the detected face.

9. The method of claim 1, wherein the plurality of candidate faces are selected based on illumination similarity to the detected face.

10. The method of claim 1, wherein at least a portion of one of the plurality of candidate faces is selected based on the similarity of boundary pixels in the at least a portion of the candidate face to boundary pixels in the detected face.

11. The method of claim 10, further comprising copying at least another portion of another of the plurality of candidate faces to the copy of the input image that is aligned with the generic image to form a swapped-face image.

12. The method of claim 1, further comprising:
selecting at least a portion of a second candidate face associated with the pose bin;
copying the at least a portion of the second candidate face to a second copy of the input image that is aligned with the generic image to form a second swapped-face image; and
comparing one of the plurality of swapped-face images and the second swapped-face image.

13. A system for swapping faces in images, comprising:
a processor that: receives a detected face and face data corresponding to an input image;
identifies a pose bin associated with the detected face based on the face data;
aligns the detected face to a generic face associated with the pose bin;
selects at least a portion of a candidate face a plurality of candidate faces associated with the pose bin;
copies at least a portion of each of the plurality of candidate faces to a copy of the input image that is aligned with the generic face to form a plurality of swapped-face images;
compares boundary pixels in each of the plurality of swapped-face images with boundary pixels in the detected face;
selects a swapped-face image from the plurality of swapped-face images based on the comparing;
aligns the selected swapped-face image to the input image to form an output image; and
outputs the output image to a display; and
a display that displays the output image.

14. The system of claim 13, wherein the processor also performs face detection on the input image to provide the detected face and the face data.

15. The system of claim 13, wherein the pose bin has an associated range of yaw values and an associated range of pitch values.

16. The system of claim 13, wherein the detected face is aligned to the generic face using an affine transformation.

17. The system of claim 13, wherein the plurality of candidate faces are selected based on pose similarity to the detected face.

18. The system of claim 13, wherein the plurality of candidate faces are selected based on resolution similarity to the detected face.

19. The system of claim 13, wherein the plurality of candidate faces are selected based on average color similarity to the detected face.

20. The system of claim 13, wherein the plurality of candidate faces are selected based on blur similarity to the detected face.

21. The system of claim 13, wherein the plurality of candidate faces are selected based on illumination similarity to the detected face.

22. The system of claim 13, wherein at least a portion of one of the plurality of candidate faces is selected based on the similarity of boundary pixels in the at least a portion of the candidate face to boundary pixels in the detected face.

23. The system of claim 22, wherein the processor also copies at least another portion of another of the plurality of candidate faces to the copy of the input image that is aligned with the generic image to form the swapped-face image.

24. The system of claim 13, wherein the processor also:
selects at least a portion of a second candidate face associated with the pose bin;
copies the at least a portion of the second candidate face to a second copy of the input image that is aligned with the generic image to form a second swapped-face image; and
compares one of the plurality of swapped-face images and the second swapped-face image.

25. A non-transitory computer-readable medium containing computer-executable instructions that, when executed by a processor, cause the processor to perform a method for swapping faces in images, the method comprising:
receiving a detected face and face data corresponding to an input image;

identifying a pose bin associated with the detected face based on the face data;

aligning the detected face to a generic face associated with the pose bin;

selecting a plurality of candidate faces associated with the pose bin;

copying at least a portion of each of the plurality of candidate faces to a copy of the input image that is aligned with the generic face to form a plurality of swapped-face images;

comparing boundary pixels in each of the plurality of swapped-face images with boundary pixels in the detected face;

selecting a swapped-face image from the plurality of swapped-face images based on the comparing;

aligning the selected swapped-face image to the input image to form an output image; and outputting the output image to a display.

26. The non-transitory computer-readable medium of claim 25, wherein the method further comprises performing face detection on the input image to provide the detected face and the face data.

27. The non-transitory computer-readable medium of claim 25, wherein the pose bin has an associated range of yaw values and an associated range of pitch values.

28. The non-transitory computer-readable medium of claim 25, wherein the detected face is aligned to the generic face using an affine transformation.

29. The non-transitory computer-readable medium of claim 25, wherein the plurality of candidate faces are selected based on pose similarity to the detected face.

30. The non-transitory computer-readable medium of claim 25, wherein the plurality of candidate faces are selected based on resolution similarity to the detected face.

31. The non-transitory computer-readable medium of claim 25, wherein the plurality of candidate faces are selected based on average color similarity to the detected face.

32. The non-transitory computer-readable medium of claim 25, wherein the plurality of candidate faces are selected based on blur similarity to the detected face.

33. The non-transitory computer-readable medium of claim 25, wherein the plurality of candidate faces are selected based on illumination similarity to the detected face.

34. The non-transitory computer-readable medium of claim 25, wherein the at least a portion of one of the plurality of candidate faces is selected based on the similarity of boundary pixels in the at least a portion of the candidate face to boundary pixels in the detected face.

35. The non-transitory computer-readable medium of claim 34, wherein the method further comprises copying at least another portion of another of the plurality of candidate faces to the copy of the input image that is aligned with the generic image to form a swapped-face image.

36. The non-transitory computer-readable medium of claim 25, wherein the method further comprises:

selecting at least a portion of a second candidate face associated with the pose bin;

copying the at least a portion of the second candidate face to a second copy of the input image that is aligned with the generic image to form a second swapped-face image; and comparing one of the plurality of swapped-face images and the second swapped-face image.

* * * * *